Jan. 4, 1938. A. C. LINNE 2,104,234

VALVE STEM CLEARANCE CHECK

Filed May 22, 1936

INVENTOR
August C. Linne,
BY Minturn & Minturn,
ATTORNEYS

Patented Jan. 4, 1938

2,104,234

UNITED STATES PATENT OFFICE 2,104,234

VALVE STEM CLEARANCE CHECK

August C. Linne, Indianapolis, Ind.

Application May 22, 1936, Serial No. 81,180

3 Claims. (Cl. 33—147)

This invention relates to the securing of an accurate clearance between a valve stem and its operating member such as a push rod or cam. A primary object of the invention is to provide means for determining accurately the exact length of valve stem to be employed in relation to the position of the valve as actually used in the engine. At present, particularly on the V block type of engines, it is a slow, tedious job to fit valves and secure the proper clearance between the valve stems and the push rods. By my invention, a master valve may be employed to secure the exact length between push rod and valve seat and from the length thus obtained the valve to be employed in that particular position may be fitted as to the length of its stem to give the desired amount of clearance.

Figure 1:
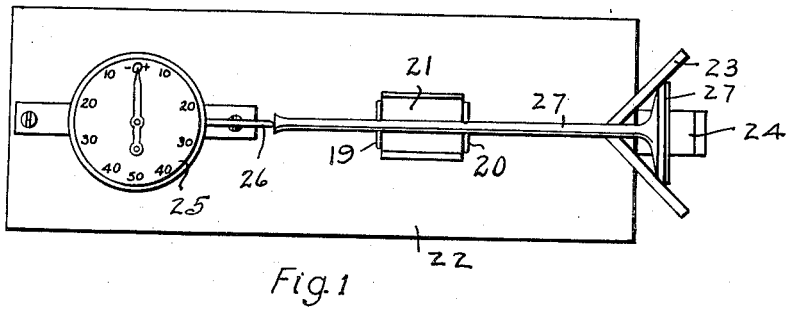
Figure 2:
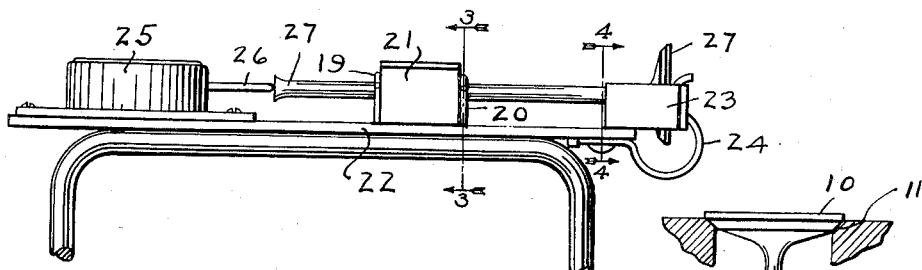
Figure 3:
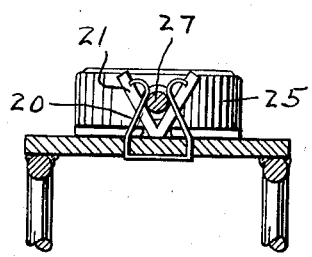
Figure 4:
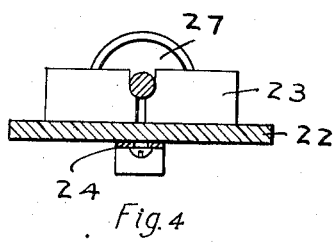

Other objects and advantages of the invention will become apparent to those versed in the art in the following description of the invention as illustrated more or less diagrammatically in one particular form in the accompanying drawing, in which Fig. 1 is a top plan view of apparatus employed in my invention;

Fig. 2, a side elevation;

Fig. 3, a vertical transverse section on the line 3—3 in Fig. 2;

Fig. 4, a vertical transverse section on the line 4—4 in Fig. 2, and

Figure 5:
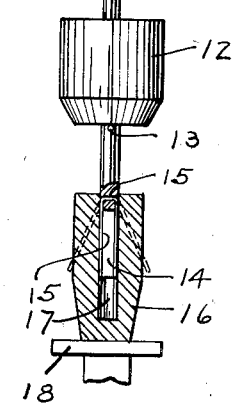

Fig. 5, a detail in side elevation of a master checking valve.

Like characters of reference indicate like parts throughout the several views in the drawing.

Referring first to Fig. 5, I employ a valve 10 having a head which will seat in the valve seat 11 on which will operate the valve to be fitted. The valve 10 is provided with a detachable sleeve 12 taking the place of the usual valve guide. This sleeve 12 is prevented from sliding down the stem by gravity by means of a cross pin 13 extending through the valve stem.

The lower end of the valve stem is slotted. Above the upper end of the slot 14 the stem is drilled through transversely and a spring wire 15 is passed through the drilled hole and bent downwardly so that its free ends may be carried into the slot 14 upon sufficient pressure being exerted against those ends. Normally the free ends will extend from the valve stem as indicated by the dash lines, Fig. 5. A shoe 16 is formed to have a central bore 17 therein terminating above the lower end of the shoe. The bore 17 has a diameter which will just permit the entrance therein with a close sliding fit of the valve stem. The free ends of the wire 15 are pressed into the slot 14 to permit the shoe 16 to be pushed up over the end of the valve stem. The wire 15 is employed to serve as a means for retaining the shoe 16 in any desired longitudinal position over the valve stem end, the wire ends compressibly bearing against the wall of the bore 17.

In using the master valve 10, the shoe 16 is adjusted to the position such as is indicated in Fig. 5 and the valve 10 then lowered through the valve seat 11 to have the sleeve 12 guide the stem in the customary manner through the cylinder block (not shown) and to permit the lower end of the shoe 16 to come into contact with the operating member, here shown as the upper end of the push rod 18. The valve 10 is then pushed downwardly until the head seats on the seat 11. In this travel, the stem of the valve 10 will travel downwardly within the bore 17 of the shoe 16. After the valve is thus seated, it is lifted and withdrawn with the shoe 16 remaining in place. The valve with the shoe thus adjusted is then carried to a fixture as indicated in Figs. 1–4. The sleeve 12 being in two parts as shown by the vertical line above pin 13, is taken apart and removed and the stem of the valve is pressed down between the springs 19 and 20 to seat the stem in a V block 21 turned upwardly from a table 22. The springs 19 and 20 are so formed as indicated in Fig. 3 to spread and allow the stem to pass between them and then close against and around the stem of the valve sufficiently as to retain the stem within the V block. The head of the valve comes between the jaws of another V block 23 and is pushed longitudinally thereagainst by means of a spring clip 24 which is here shown as being secured to the under side of the table 22 and carried downwardly and around to bear against the outer side of the head of the valve so as to maintain the valve in firm contact against the walls of the V block 23. The table 22 carries a suitable indicator 25 having a plunger 26 directed toward the end of the valve stem, or in the present instance, the shoe 16. The indicator 25 is of course adjustably positioned on the table 22 for different valves of different valve stem lengths. For the valves from any one engine, the indicator would remain in a fixed position relative to the table 22. The reading of the indicator 25 is indicated with the plunger 26 slightly pressing against the end of the shoe 16. The indicator 25 is of that type which will permit the dial to be set for a zero reading for this length. The indicator is fixed in this position of adjustment and the valve 10 removed. A standard valve 27 which is the one to be actually used in the engine being fitted is then placed across the V block 21 to have its head brought up against the jaws of the V block 23 by the spring 24 with the end of the valve stem abutting the plunger 26. The reading on the indicator 25 may be noted in order to determine how much of the valve stem must be ground off to give the required clearance. For example, if there is to be a clearance of .010 inch, the valve stem is carefully ground off and checked in the fixture until the dial of the indicator 25 shows the reading of the clearance accordingly. Then when the valve 27 is placed down through the valve seat 11, there will be that exact clearance of .010 inch between the lower end of its valve stem and the push rod 18. Thus for each and every valve being seated, the exact clearance for that valve may be determined in advance without having to use feeler gauges and the customary cut and try methods.

I find that by the use of my method and the features indicated, not only may clearances be accurately determined and provided, but also there is a considerable saving in time in fitting the valve stems.

While I have herein shown and described my invention in the form as now best known to me, it is obvious that structural variations may be employed without departing from the spirit of the invention and I, therefore, do not desire to be limited to that precise form beyond the limitations as may be imposed by the following claims.

I claim:

1. In a device for obtaining desired valve stem clearance of a valve having a stem, a table, a valve stem receiving member on the table, across which member the stem is longitudinally slidable in a guided manner, a spring, a valve head abutting member against which the head is urged by the spring to a stopped position, and indicator means having a member directed toward the stem receiving member to abut the end of a stem extending toward said indicator member.

2. In a device for obtaining desired valve stem clearance of a valve having a stem, a table, a channeled member on the table in which the stem of the valve is longitudinally slidable, spring means for seating the stem in the channel, a block having a pair of jaws between which jaws the valve head is adapted to be urged to a stopped position, a spring urging the head against the jaws and an indicator having an actuating member directed toward the stem receiving member to contact the end of the stem extending therefrom.

3. In a device for obtaining desired valve stem clearance, of a valve having a stem, a table, a V-shaped valve stem receiving member in which the stem is longitudinally slidable, spring means for holding the stem in the receiving member, a V-block between the jaws of which the valve head is urged to a stopped position, a spring urging the head against the jaws, and an indicator having a plunger directed toward the stem receiving member to abut the end of a stem extending thereacross.

AUGUST C. LINNE.